US011370673B2

(12) United States Patent
Salters et al.

(10) Patent No.: US 11,370,673 B2
(45) Date of Patent: Jun. 28, 2022

(54) ASSEMBLY COMPRISING AT LEAST TWO ELEMENTS IN A MOVABLE ARRANGEMENT RELATIVE TO EACH OTHER AND AN ANTI-FOULING SYSTEM

(71) Applicant: KONINKLIJKE PHILIPS N.V., Eindhoven (NL)

(72) Inventors: Bart Andre Salters, Eindhoven (NL); Roelant Boudewijn Hietbrink, Utrecht (NL)

(73) Assignee: Koninklijke Philips N.V., Eindhoven (NL)

( * ) Notice: Subject to any disclaimer, the term of this patent is extended or adjusted under 35 U.S.C. 154(b) by 472 days.

(21) Appl. No.: 16/082,293

(22) PCT Filed: Mar. 8, 2017

(86) PCT No.: PCT/EP2017/055441
§ 371 (c)(1),
(2) Date: Sep. 5, 2018

(87) PCT Pub. No.: WO2017/153473
PCT Pub. Date: Sep. 14, 2017

(65) Prior Publication Data
US 2019/0031534 A1 Jan. 31, 2019

(30) Foreign Application Priority Data

Mar. 9, 2016 (EP) ..................................... 16159296
Aug. 17, 2016 (EP) ..................................... 16184450

(51) Int. Cl.
C02F 1/32 (2006.01)
C02F 1/00 (2006.01)
(Continued)

(52) U.S. Cl.
CPC ................ C02F 1/32 (2013.01); B01D 29/31 (2013.01); B01D 29/66 (2013.01); B01D 29/94 (2013.01);
(Continued)

(58) Field of Classification Search
CPC .. C02F 1/32; C02F 1/001; C02F 1/008; C02F 1/00; C02F 2103/008; C02F 2201/3222;
(Continued)

(56) References Cited

U.S. PATENT DOCUMENTS

2011/0226681 A1* 9/2011 Lee .......................... C02F 1/325
210/90
2011/0305597 A1* 12/2011 Farren ....................... A61L 2/10
422/24
(Continued)

FOREIGN PATENT DOCUMENTS

CN 102923292 A 2/2013
CN 104528957 A 4/2015
(Continued)

Primary Examiner — Akash K Varma

(57) ABSTRACT

An assembly comprising at least two elements in a movable arrangement relative to each other for performing a first function of the assembly is furthermore equipped with an anti-biofouling system for subjecting at least an area of the assembly that is to be at least partially exposed to water during at least a part of its lifetime to an anti-biofouling action as an additional function of the assembly, different from the first function of the assembly. The anti-biofouling system comprises one or more light sources for emitting anti-biofouling light, and the anti-biofouling system is adapted to realize coverage of the area with the anti-biofouling light on the basis of the movable arrangement of the at least two elements relative to each other for performing the first function of the assembly.

14 Claims, 6 Drawing Sheets

(51) Int. Cl.
  *B01D 29/31* (2006.01)
  *B01D 29/66* (2006.01)
  *B01D 29/94* (2006.01)
  *B08B 7/00* (2006.01)
  *B08B 17/02* (2006.01)
  *B63B 59/04* (2006.01)
  *B63J 4/00* (2006.01)
  *C02F 103/00* (2006.01)

(52) U.S. Cl.
  CPC .......... *B08B 7/0035* (2013.01); *B08B 7/0057* (2013.01); *B08B 17/02* (2013.01); *B63B 59/04* (2013.01); *B63J 4/002* (2013.01); *C02F 1/001* (2013.01); *C02F 1/008* (2013.01); *B08B 7/005* (2013.01); *B08B 7/0042* (2013.01); *C02F 2103/008* (2013.01); *C02F 2201/3222* (2013.01); *C02F 2201/3227* (2013.01); *C02F 2201/3228* (2013.01); *C02F 2303/20* (2013.01)

(58) Field of Classification Search
  CPC ...... C02F 2201/3227; C02F 2201/3228; C02F 2303/20; B01D 29/31; B01D 29/66; B01D 29/94; B01D 46/04; B08B 7/0057; B08B 7/0035; B08B 7/0042; B08B 7/005; B08B 7/00; B08B 17/02; B63B 59/04; B63B 59/00; B63J 4/002; B63J 4/00

USPC ........................................................ 210/745
See application file for complete search history.

(56) References Cited

U.S. PATENT DOCUMENTS

| | | | | |
|---|---|---|---|---|
| 2012/0050520 | A1* | 3/2012 | Thoren | B63B 59/08 348/81 |
| 2013/0319925 | A1* | 12/2013 | Yee | C02F 1/325 210/251 |
| 2014/0158617 | A1* | 6/2014 | Dale | B01D 29/52 210/636 |

FOREIGN PATENT DOCUMENTS

| | | |
|---|---|---|
| DE | 212010000003 U1 | 1/2011 |
| JP | 02214588 A | 2/1989 |
| JP | 10216716 A | 2/1997 |
| TW | 304372 U | 7/2006 |
| WO | 2010074454 A2 | 7/2010 |
| WO | 2012153117 A1 | 11/2012 |
| WO | 2016000980 A1 | 1/2016 |
| WO | 2016001227 A1 | 1/2016 |
| WO | 2016107829 A1 | 7/2016 |

* cited by examiner

US 11,370,673 B2

ASSEMBLY COMPRISING AT LEAST TWO ELEMENTS IN A MOVABLE ARRANGEMENT RELATIVE TO EACH OTHER AND AN ANTI-FOULING SYSTEM

CROSS-REFERENCE TO PRIOR APPLICATIONS

This application is the U.S. National Phase application under 35 U.S.C. § 371 of International Application No. PCT/EP2017/055441, filed on 8 Mar. 2017, which claims the benefit of European Patent Application No. 16159296.9, filed on 9 Mar. 2016 and European Patent Application No. 16184450.1, filed on 17 Aug. 2016. These applications are hereby incorporated by reference herein.

FIELD OF THE INVENTION

The invention relates to an assembly comprising at least two elements in a movable arrangement relative to each other for performing a first function of the assembly. When the invention is put to practice, the assembly as mentioned is equipped with an anti-biofouling system for subjecting at least an area of the assembly to be at least partially exposed to water during at least a part of its lifetime to an anti-biofouling action as an additional function of the assembly, different from the first function of the assembly. In particular, one of the elements is an encompassing element having an interior space, wherein the other of the elements is an encompassed element extending at least partially through the interior space of the encompassing element. The invention furthermore relates to a method for controlling operation of an anti-biofouling system as mentioned.

BACKGROUND OF THE INVENTION

Biofouling of surfaces which are exposed to water, during at least a part of their lifetime, is a well-known phenomenon, which causes problems in many fields, including the field of assemblies comprising an encompassing element and an encompassed element in a movable arrangement relative to each other, such as water bearings and filter assemblies comprising a filter cleaning system.

In a general sense, water bearings comprise a movable shaft which is at least partially encompassed by a bearing shell. In particular, the shaft may be rotatable and/or linearly displaceable in an axial direction. Many applications of water bearings are known, including an application in which the movable shaft serves for supporting a vessel's propeller. Water bearings come in various embodiments, including embodiments in which the bearing shell has grooves in an interior surface thereof for allowing small columns of water to be present between the bearing shell and the shaft at predetermined places in the water bearing. In any case, the operation of water bearings relies on having a thin film of water between the interior surface of the bearing shell and the shaft. Due to the exposure of the shaft and the interior surface of the bearing shell to water, biofouling of at least one of the shaft and the interior surface of the bearing shell may occur, as a result of which the narrow space between the shaft and the interior surface of the bearing shell gets clogged, which eventually has negative consequences for the operation of the water bearings.

WO 2012/153117 A1 discloses a filter assembly comprising a tubular filter screen and a movable shaft, in which the movable shaft serves for supporting debris receiving portions of a back-washing mechanism for removing debris from the filter screen, at the side of an interior surface of the filter screen. The permeability of the filter screen may be selected to be in an order of magnitude of microns, in which case a filter mesh size needs to be very small. Normally, the water to be filtered is forced to flow from inside the filter screen to outside the filter screen. During a cleaning action performed by the back-washing system, the water is forced to flow the opposite way, hence, from outside the filter screen to inside the filter screen.

In an embodiment, the back-washing mechanism involves linear movement of the shaft only, and the shaft is constructed from a central hollow tube that carries a set of specially designed debris receiving portions in the form of disc-shaped components that extend outwards from the central hollow tube to the interior surface of the filter screen. The outer periphery of the disc-shaped components terminates with a sealing head or sealing arrangement which compensates for irregularities in the filter screen and provides an effective seal between the disc-shaped components and the interior surface of the filter screen in order to minimize leakage of unfiltered fluid. A sealing head or a sealing arrangement as mentioned comprises a slot or channel for allowing debris to pass from the interior surface of the filter screen into the respective debris receiving portion. In particular, the slot or channel is present around the entire periphery of the interior surface of the filter screen, providing 360° coverage. The central hollow tube is driven externally by a linear actuator which provides a linear motion to the back-washing mechanism. The central hollow tube is in communication with a debris collection chamber for receiving debris that is removed from the interior surface of the filter screen during operation of the back-washing mechanism.

A known alternative to the disc-shaped components involves radial arms extending from the central hollow tube, wherein the tube is not only provided with a linear motion, but also with a rotational motion in order to have 360° coverage of the periphery of the interior surface of the filter screen.

It appears in practice that a back-washing mechanism for use with a tubular filter screen, such as known from WO 2012/153117 A1, yields good results in removing debris from the filter screen. Nevertheless, it also appears that the known back-washing mechanism is not effective in keeping the filter screen clean and avoiding the filter screen from getting clogged. The reason is found in the fact that it is practically impossible to remove biofouling from the filter screen by means of mechanical techniques. For example, mussel larvae may get stuck in the filter screen, which may cause mussels to grow on the filter screen, in spite of regular cleaning actions performed by the back-washing mechanism. As a consequence, the effectiveness of the filtering process to be performed by means of the filter assembly is eventually reduced and/or the filtering process can only be performed at high pressures.

It follows from the foregoing that there is a need for a durable solution aimed at realizing an appropriate and effective anti-biofouling action in water bearings, filter assemblies comprising a filter screen and a movable shaft which is part of a filter cleaning system, and other assemblies comprising at least two elements in a movable arrangement relative to each other, particularly an encompassing element and an encompassed element. It is highly preferred for such a solution to not introduce a need of changing the original design of the assemblies, i.e. the design of the assemblies without a suitable anti-biofouling system, which design is optimized for allowing the elements in a movable arrangement to perform a first function of the assembly, which is a bearing function in the case of a water bearing, and which is a debris removing function in the case of a filter assembly of the type as described in the foregoing.

In general, biofouling is the accumulation of microorganisms, plants, algae, small animals and the like on surfaces. According to some estimates, over 1,800 species comprising over 4,000 organisms are responsible for biofouling. Hence, biofouling is caused by a wide variety of organisms, and involves much more than an attachment of barnacles and seaweeds to surfaces. Biofouling is divided into micro fouling which includes biofilm formation and bacterial adhesion, and macro fouling which includes the attachment of larger organisms. Due to the distinct chemistry and biology that determine what prevents them from settling, organisms are also classified as being hard or soft. Hard fouling organisms include calcareous organisms such as barnacles, encrusting bryozoans, mollusks, polychaetes and other tube worms, and zebra mussels. Soft fouling organisms include non-calcareous organisms such as seaweed, hydroids, algae and biofilm "slime". Together, these organisms form a fouling community.

As mentioned in the foregoing, biofouling creates substantial problems. Biofouling can cause machinery to stop working and water inlets to get clogged, to mention only two negative consequences. Hence, the topic of anti-biofouling, i.e. the process of removing or preventing biofouling, is well-known. In industrial processes involving wetted surfaces, bio dispersants can be used to control biofouling. In less controlled environments, fouling organisms are killed or repelled with coatings using biocides, thermal treatments or pulses of energy. Nontoxic mechanical strategies that prevent organisms from attaching to a surface include choosing a material or coating for causing the surface to be slippery, or creating nanoscale surface topologies similar to the skin of sharks and dolphins which only offer poor anchor points. The invention is intended to make a new contribution to the variety of available anti-biofouling solutions, particularly aimed at subjecting at least an area of an assembly comprising at least two elements, such as an encompassing element and an encompassed element in a movable arrangement relative to each other, which area is to be at least partially exposed to water during at least a part of its lifetime, to an anti-biofouling action.

An example of an anti-biofouling system is known from WO 2016/107829 A1. In particular, the known anti-biofouling system is configured for preventing or reducing biofouling on a fouling element of an object. Fouling is prevented by irradiating an anti-fouling light onto the fouling element. To that end, the anti-biofouling system comprises at least one laser light source configured to generate the anti-biofouling light and to provide the anti-biofouling light to the fouling element during use, wherein the system is arranged such that during use the fouling element at least partly moves with respect to the laser light source. A practical example of a movable fouling element is a propeller (blade) of a ship.

SUMMARY OF THE INVENTION

According to the invention, an assembly comprising at least two elements in a movable arrangement relative to each other for performing a first function of the assembly is provided with an anti-biofouling system for subjecting at least an area of the assembly to be at least partially exposed to water during at least a part of its lifetime to an anti-biofouling action as an additional function of the assembly, different from the first function of the assembly, wherein the anti-biofouling system comprises one or more light sources for emitting anti-biofouling light, wherein the anti-biofouling system is adapted to realize coverage of the area with the anti-biofouling light on the basis of the movable arrangement of the at least two elements relative to each other for performing the first function of the assembly, wherein one of the elements is an encompassing element having an interior space, wherein the other of the elements is an encompassed element extending at least partially through the interior space of the encompassing element, and wherein the area to be subjected to the anti-biofouling action includes at least a surface portion of the encompassing element.

It follows from the foregoing definition that the invention involves more than just equipping an assembly in which it is desired to realize anti-biofouling effects with an anti-biofouling system. In particular, clever use is made of the fact that in the type of assembly which is the subject of the invention, at least two elements in a movable arrangement are present. According to an insight underlying the invention, the movable arrangement of the elements relative to each other can be used in a process of realizing coverage of an area of the assembly with the anti-biofouling light which is emitted from the one or more light sources of the anti-biofouling system during operation of the anti-biofouling system, which allows for having only a minimum of light sources in the assembly. Thus, in the assembly according to the invention, the movable arrangement of the at least two elements is aimed at realizing a first function of the assembly, which may be any function, and the movable arrangement of the at least two elements is furthermore used for realizing coverage of an area of the assembly to be subjected to an anti-biofouling action with the anti-biofouling light of the one or more light sources of the anti-biofouling system, wherein subjecting the area to the anti-biofouling action constitutes an additional function of the assembly. This is a different approach than a traditional approach in which coverage of an area with anti-biofouling light involves ensuring that the entire area is in the ambit of one light source or a combination of light sources, so that the area is entirely exposed to the anti-biofouling light. For the sake of clarity, it is noted that the wording "anti-biofouling light of the one or more light sources" as used in this text should be understood such as to mean "anti-biofouling light emitted by the one or more light sources during operation of the anti-biofouling system". Furthermore, it is noted that the indication of an action as being an anti-biofouling action should be understood such as to mean that the action is aimed at preventing biofouling, removing biofouling, or both.

It is practical for the one or more light sources of the anti-biofouling system to be particularly adapted to emit ultraviolet light during operation of the anti-biofouling system. A general advantage of using ultraviolet light for realizing anti-biofouling is that the microorganisms are prevented from adhering and rooting on the surface to be kept clean, without any harmful side effects or side effects which cannot be easily counteracted.

For the sake of completeness, the following is noted in respect of anti-biofouling by using ultraviolet light. The one or more light sources of the anti-biofouling system may be chosen to specifically emit ultraviolet light of the c type, which is also known as UVC light, and even more specifically, light with a wavelength roughly between 250 nm and 300 nm. It has been found that most fouling organisms are killed, rendered inactive, or rendered unable to reproduce by exposing them to a certain dose of the ultraviolet light. A typical intensity which appears to be suitable for realizing anti-biofouling is 10 mW per square meter. The light may be applied continuously or at a suitable frequency, whatever is appropriate in a given situation, especially at a given light intensity. A very efficient source for producing UVC light is a low pressure mercury discharge lamp, in which an average of 35% of input power is converted to UVC power. Another useful type of lamp is a medium pressure mercury discharge lamp. The lamp may be equipped with an envelope of special glass for filtering out ozone-forming radiation. Furthermore, a dimmer may be used with the lamp if so desired. Other types of useful UVC lamps are dielectric barrier discharge lamps, which are known for providing very powerful ultraviolet light at various wavelengths and at high electrical-to-optical power efficiencies, lasers and LEDs. In respect of the LEDs, it is noted that they can generally be included in relatively small packages and consume less power than other types of light sources. LEDs can be manufactured to emit (ultraviolet) light of various desired wavelengths, and their operating parameters, most notably the output power, can be controlled to a high degree.

A light source for emitting ultraviolet light can be provided in the form of a tubular lamp, more or less comparable to a well-known TL (tube luminescent/fluorescent) lamp. For various known germicidal tubular UVC lamps, the electrical and mechanical properties are comparable to those properties of tubular lamps for producing visible light. This allows the UVC lamps to be operated in the same way as the well-known lamps, wherein an electronic or magnetic ballast/starter circuit may be used, for example.

In the assembly according to the invention, the area to be subjected to the anti-biofouling action may include at least a surface portion of at least one of the elements. Furthermore, one or more light sources of the anti-biofouling system may be situated at one of the elements for emitting anti-biofouling light to the other of the elements. In a more general sense, the one or more light sources of the anti-biofouling system may be situated for realizing coverage of the area to be subjected to an anti-biofouling action with the anti-biofouling light on the basis of the movable arrangement of the at least two elements of the assembly relative to each other. Options existing in the framework of the invention involve an option according to which the one or more light sources of the anti-biofouling system are situated at only one of the elements and an option according to which the one or more light sources of the anti-biofouling system are situated at both of the elements. In respect of the movable arrangement of the element relative to each other, it is noted that having such an arrangement may imply that only one of the elements is movable and that the other of the elements is stationary, or that both of the elements are movable. In the first case, depending on the particulars of a situation in which it is desirable to situate one or more light sources of the anti-biofouling system at one or both of the elements, it is possible to situate those light sources on the movable element only, on the stationary element only, or to distribute those light sources over both elements.

Typically, in the framework of the invention, it is possible to have a configuration in which one or more light sources of the anti-biofouling system are arranged for emitting anti-biofouling light to surface portions of at least one of the elements which are successively put in the ambit of the one or more light sources during relative movement of the elements. For example, when one of the elements, for example the encompassed element is shaped like a rotatable shaft, and the other of the elements, for example the encompassing element is a stationary shell encompassing a portion of the shaft, it may suffice to have only one elongated light source extending along an interior surface of the shell, from one side of the shell to another, in a direction which is an axial direction of the shaft-shell combination, assuming that it is desired to subject the entire portion of the shaft encompassed by the shell to an anti-biofouling action. The fact is that in such a case, coverage of the portion of the shaft in the axial direction is realized on the basis of the light source extending from the one side of the shell to the other in the axial direction, and 360° coverage of the periphery of the portion of the shaft is realized as the shaft rotates.

Realizing coverage of an area with anti-biofouling light on the basis of a movable arrangement of at least two elements relative to each other implies a need for actually moving the elements relative to each other, at least from time to time. In view thereof, it is advantageous for the assembly according to the invention to comprise a controller which is adapted to assess whether the elements are in a stationary position with respect to each other, and, if such is found to be the case, to assess whether the duration of the relative stationary position exceeds a predetermined maximum duration, and, if such is found to be the case, to initiate relative movement of the elements in combination with an activated condition of the one or more light sources of the anti-biofouling system. In that way, even in situations in which there is no need for performing the first function of the assembly and moving the elements relative to each other, it is still possible to have an effective anti-biofouling action in the assembly, provided that an appropriate value of the predetermined maximum duration is chosen.

In respect of the possibility of the assembly according to the invention comprising a controller as mentioned, it is noted that the invention also relates to a method for controlling operation of an anti-biofouling system which is part of an assembly comprising at least two elements in a movable arrangement relative to each other for performing a first function of the assembly, the anti-biofouling system being adapted to subject at least an area of the assembly to be at least partially exposed to water during at least a part of its lifetime to an anti-biofouling action as an additional function of the assembly, different from the first function of the assembly, wherein the anti-biofouling system comprises one or more light sources for emitting anti-biofouling light, wherein the anti-biofouling system is adapted to realize coverage of the area with the anti-biofouling light on the basis of the movable arrangement of the at least two elements relative to each other for performing the first function of the assembly, and wherein the method comprises the steps of assessing whether the elements are in a stationary position with respect to each other, and, if such is found to be the case, assessing whether the duration of the relative stationary position exceeds a predetermined maximum duration, and, if such is found to be the case, initiating relative movement of the elements in combination with an activated condition of the one or more light sources of the anti-biofouling system.

The elements of the assembly which are in a movable arrangement relative to each other for performing a first function of the assembly may have any shape and may be in any positioning with respect to each other. In any case, as is the case with water bearings and filter assemblies comprising a tubular filter screen and a movable shaft carrying members of a filter cleaning system, one of the elements is an encompassing element having an interior space, and the other of the elements is an encompassed element extending at least partially through the interior space of the encompassing element. Embodiments of the assembly are feasible in which the one or more light sources of the anti-biofouling system are present on the encompassing element only, on the encompassed element only, or on both the encompassing element and the encompassed element. Furthermore, it may be so that the encompassing element is stationary and the encompassed element is movable, or the other way around, or that both elements are movable. In any case, relative movements of the elements which are possible in such a configuration involve rotational movements and linear movements.

In one feasible embodiment of the assembly comprising an encompassing element and an encompassed element as mentioned, the encompassed element is both rotatable and linearly displaceable relative to the encompassing element, and the one or more light sources of the anti-biofouling system are situated at the encompassed element. By having various types of movement combined in the encompassed element, advantageous options of covering an interior surface of the encompassing element with the anti-biofouling light of the one or more light sources are available, at any appropriate design and positioning of the one or more light sources.

In the framework of the invention, numerous options exist when it comes to the design of the anti-biofouling system. A number of options will now be mentioned, wherein it is noted that these options as mentioned may be applied separately, but that it is also possible to have a combination of two or more of these options in one and the same assembly. According to a first option, the anti-biofouling system comprises a covering of at least a surface portion of at least one of the elements, wherein one or more light sources of the anti-biofouling system are situated in the covering, and wherein the covering is at least partially transparent to the anti-biofouling light of the one or more light sources so as to allow the anti-biofouling light to actually shine from the covering. According to a second option, the anti-biofouling system comprises at least one carrier member, wherein one or more light sources of the anti-biofouling system are situated in the carrier member, and wherein the carrier member is at least partially transparent to the anti-biofouling light of the one or more light sources. Advantageously, at least one of the elements comprises at least one recess, so that it is possible for the at least one carrier member of the anti-biofouling system to be reliably attached to an element by being situated in the at least one recess of that element. According to a third option, the anti-biofouling system comprises one or more light sources which are attached to one of the elements. For example, one or more light sources may be arranged directly on one of the elements, or may be attached to one of the elements through a suitable connection member, which may be rigid or at least partially resilient, whatever is appropriate in a given situation. According to a fourth option, the encompassed element comprises a shaft which is at least partially hollow, wherein one or more light sources of the anti-biofouling system are situated inside the shaft, and wherein the shaft is at least partially transparent to the anti-biofouling light of the one or more light sources. For example, the anti-biofouling system may comprise a tubular lamp which is arranged so as to extend through a movable shaft which is made of material that is transparent to the anti-biofouling light, or which comprises windows made of such material. An advantage of the fourth option as mentioned is that it is possible to have a configuration that allows for easy replacement of the at least one light source of the anti-biofouling system, particularly replacement which does not involve a need for taking the assembly apart in some way.

As mentioned earlier, the assembly according to the invention may be a water bearing comprising a movable shaft which is at least partially encompassed by a bearing shell, the bearing shell optionally having grooves in an interior surface thereof. In such a case, the movable shaft and the bearing shell constitute two elements in a movable arrangement relative to each other for performing a first function of the assembly, which is a bearing function. Depending on the nature and the intended application of the water bearing, the shaft may be arranged such as to be rotatable or linearly displaceable relative to the bearing shell.

Numerous other options exist in respect of the type of the assembly and the first function to be performed by at least two elements of the assembly in a movable arrangement relative to each other. For example, it is possible for the assembly according to the invention to be a filter assembly comprising a tubular filter screen and a movable shaft being at least partially encompassed by the filter screen and carrying members of a filter cleaning system for removing and receiving debris from an interior surface of the filter screen, i.e. to be a filter assembly of the type known from WO 2012/153117 A1. In such a case, the filter screen and the combination of the shaft and the members carried by the shaft constitute two elements in a movable arrangement relative to each other for performing a first function of the assembly, which is a function of removing debris from the filter screen. It may be so that it is especially desirable to perform an anti-biofouling action on the filter screen. In that case, it is advantageous if the movable shaft-members combination is equipped with the one or more light sources of the anti-biofouling system, the one or more light sources being arranged to emit anti-biofouling light to the filter screen. The members of the filter cleaning system may have an elongated shape and project from the shaft towards the interior surface of the filter screen, in which case it is may be very effective to have one or more light sources of the anti-biofouling system situated at an end of the members facing the interior surface of the filter screen, i.e. positioned on such end or in the direct vicinity of such end. The movable shaft-members combination may be rotatable and/or linearly displaceable, whatever is appropriate for performing the function of removing debris from the filter screen.

In another example, it is possible for the assembly according to the invention to be a boat drive and steer assembly, comprising a rotatable propeller and a fin extending downwardly from a propeller shaft casing which serves for accommodating a shaft of the propeller and associated gearing. In such a case, the at least one anti-biofouling light source of the anti-biofouling system may be arranged in the boat drive and steer assembly at a position for realizing coverage of the surface of the propeller as the propeller rotates. In respect of the propeller shaft, it is noted that this component of the boat drive and steer assembly may be hollow, in which case it is advantageous if material that is transparent to anti-biofouling light is applied in the propeller shaft, and if the anti-biofouling system comprises an elongated light source which is arranged so as to extend through the hollow propeller shaft. In such a configuration, the light source is well protected inside the propeller shaft, and in case the light source needs to be replaced, it is relatively easy to remove the light source and put a new light source in place.

In a practical embodiment, the assembly according to the invention comprises a power system for supplying electrical power to be used for driving the one or more light sources of the anti-biofouling system. The power supply may be wired and/or wireless. According to an advantageous option, the power system is adapted to generate electrical power on the basis of movement of at least one of the elements.

The invention is applicable in various contexts. For example, one or more assemblies according to the invention may be applied in the context of a marine vessel. Various types of vessel comprising a ballast water system having one or more ballast tanks and a water filtering system for treating water coming in from the vessel's environment and being destined to serve as ballast water are known. In a vessel of such a type, one or more assemblies according to the invention may particularly be used as one or more filter assemblies of the water filtering system of the ballast water system.

The above-described and other aspects of the invention will be apparent from and elucidated with reference to the following detailed description of a number of embodiments of a filter assembly comprising a tubular filter screen, a filter cleaning system and an anti-biofouling system, wherein the filter cleaning system comprises a movable shaft extending through the filter screen and carrying members for removing and receiving debris from an interior surface of the filter screen, and wherein the anti-biofouling system comprises one or more light sources for emitting anti-biofouling light to the interior surface of the filter screen.

BRIEF DESCRIPTION OF THE DRAWINGS

The invention will now be explained in greater detail with reference to the figures, in which equal or similar parts are indicated by the same reference signs, and in which.

DETAILED DESCRIPTION OF EMBODIMENTS

The invention will now be elucidated in the context of a filter assembly comprising a tubular filter screen and a filter cleaning system. All embodiments which will now be described are in this context, but that should not be understood such as to imply that the invention is limited to this context in any way.

Figure 1:
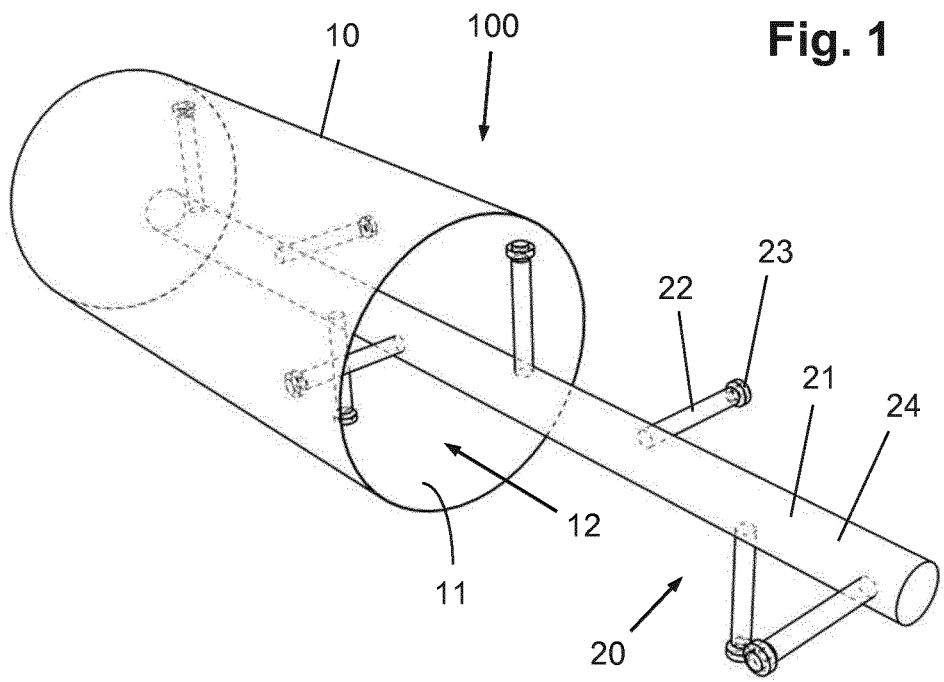
FIG. 1 illustrates a general design of a filter assembly comprising a tubular filter screen a filter cleaning system, and diagrammatically shows a perspective view of the filter assembly with a portion of the filter screen removed.

FIG. 1 serves to illustrate a general design of a filter assembly 100 comprising a tubular filter screen 10 and a filter cleaning system 20. The filter assembly 100 may be part of a larger entity, comprising a number of filter assemblies, wherein each of the filter assemblies may comprise another type of filter screen. The filter assembly 100 is suitable to be applied in various situations. For example, the filter assembly 100 may be used for the purpose of potable water production, the purpose of water intake of power plants, or the purpose of vessel ballast water management, to mention only a few of the numerous possibilities.

The filter screen 10 may be entirely made of metal, but other materials or combinations of materials are also possible. The mesh size of the filter screen 10 may be chosen so as to be appropriate for the intended use of the filter assembly, and may even be in the micron range. Normally, the water to be filtered is made to flow through the tubular filter screen 10 from the inside to the outside. As the water passes through the filter screen 10, any particles which are too large to pass through the filter screen 10 along with the water are trapped in the filter screen 10, mainly on an interior surface 11 of the filter screen 10. As time passes and the filter assembly 100 is operated, the number of such particles increases, whereby debris of filtered matter is formed. An increase of the amount of debris involves an increase of pressure loss over the filter screen 10. In order to avoid the amount of debris from getting so high that the filter assembly 100 cannot function properly anymore, the filter assembly 100 is equipped with the filter cleaning system 20 as mentioned, which is designed to remove debris from the interior surface 11 of the filter screen 10.

The necessary cleaning process can be achieved through a back-washing mechanism which may be configured for continuous cleaning or which may be activated only when the pressure loss reaches a predetermined value and/or at predetermined intervals and/or manually according to desire. The filter assembly 100 may be equipped with a debris collection chamber (not shown) where debris which is removed from the interior surface 11 of the filter screen 10 is collected. Also, an evacuation pipe may be used for evacuating the debris from the debris collection chamber. Use of the back-washing mechanism may involve cleaning the filter screen 10 by having a reverse water flow through the filter screen 10, i.e. a water flow from the outside to the inside.

In the shown example, the filter cleaning system 20 comprises a hollow shaft 21 extending through an interior space 12 of the filter screen 10, coaxially with the filter screen 10, and hollow radial arms 22 extending from the shaft 21 towards the interior surface 11 of the filter screen 10. In particular, a length of the radial arms 22 is chosen so as to allow the radial arms 22 to bridge the radial distance between the shaft 21 and the filter screen 10, wherein a debris receiving end 23 of the radial arms 22 is only at a minimal distance from the interior surface 11 of the filter screen 10. The radial arms 22 can be arranged on the shaft 21 in any appropriate pattern. For example, as shown in FIG. 1, the radial arms 22 can be distributed over the length of the shaft 21, at a regular mutual distance, wherein successive arms 22 extend from the shaft 21 at different angular positions, the difference between adjacent successive arms 22 being 90°. Both the shaft 21 and the radial arms 22 may be made of metal, but other materials or combinations of materials are also possible. In the following, the entirety of the shaft 21 and the radial arms 22 will be referred to as shaft-arms combination 24.

Removal of debris from the filter screen 10 involves activation of the filter cleaning system 20, by means of which a differential pressure across the filter screen 10 is created. In normal operation of the filter assembly 100, pressure prevailing inside the filter screen 10 is higher than pressure prevailing outside the filter screen 10, on the basis of which an outward flow of the water to be subjected to a filtering process is created. By reversing the pressure across the filter screen 10, a reverse or back-flow of water is realized, causing debris to be removed from the filter screen 10. A reversed differential pressure across the filter screen 10 may be achieved in any suitable way, wherein a vacuum or suction device in communication with the hollow shaft 21 may be used for creating a relatively low pressure at the debris receiving end 23 of the radial arms 22. Debris which is removed from a portion of the filter screen 10 which is acted upon by the debris receiving end 23 of a certain radial arm 22 flows through that radial arm 22 towards the shaft 21, and flows further through the shaft 21 towards a predetermined destination, which may be a the debris collection chamber as mentioned earlier.

In order to enable the filter cleaning system 20 as described in the foregoing to clean the entire filter screen 10, the shaft-arms combination 24 is movably arranged in the filter screen 10, in such a way that every portion of the interior surface 11 of the filter screen 10 can be reached by a debris receiving end 23 of a radial arm 22 at some point. In particular, the shaft-arms combination 24 is both rotatable and linearly movable in an axial direction, i.e. a direction along a longitudinal axis of both the shaft 21 and the tubular filter screen 10. By rotating the shaft-arms combination 24, it is possible to achieve 360° coverage of the periphery of the interior surface 11 of the filter screen 10. By linearly moving the shaft-arms combination 24 in the axial direction, it is possible to achieve coverage of the interior surface 11 of the filter screen 10 along the entire length of the filter screen 10. Any suitable means may be used for driving the shaft-arms combination 24. Also, any suitable controller may be used for controlling the movements of the shaft-arms combination 24.

Although the removal of debris by means of the filter cleaning system 20 as described in the foregoing helps in maintaining proper functioning of the filter assembly 100, there is a need for further measures, as it appears that the cleaning action performed by the filter cleaning system 20 is not effective in removing biofouling from the filter screen 10, which phenomenon occurs as a result of the filtering actions to be performed by the filter assembly 100, on the basis of the fact that the filter screen 10 is intensively contacted by water during those actions. In view thereof, the invention provides an anti-biofouling system 30 in a filter assembly. Various possible embodiments of a filter assembly which is furthermore equipped with the anti-biofouling system 30 will now be described with reference to FIGS. 2-9. All of these embodiments are based on the filter assembly 100 as described with reference to FIG. 1, and thus everything that has been explained in respect of that filter assembly 100, especially in respect of the tubular filter screen 10 and the filter cleaning system 20 which are part of that filter assembly 100, is equally applicable to these embodiments.

It is noted that according to the invention, all of the embodiments of the filter assembly have in common that the anti-biofouling system 30 comprises one or more light sources 32 for emitting anti-biofouling light, and that the anti-biofouling system 30 is adapted to realize coverage of the interior surface 11 of the filter screen 10 with the anti-biofouling light on the basis of the movable arrangement of the shaft-arms combination 24 relative to the filter screen 10 for performing the debris removing function as a first function of the filter assembly, wherein the anti-biofouling function as realized by the anti-biofouling system 30 during operation thereof is regarded as an additional function of the filter assembly, different from the debris removing function. The one or more light sources 32 of the anti-biofouling system 30 may particularly be adapted to emit ultraviolet light during operation thereof. In the shown example, the one or more light sources 32 are particularly used for emitting light to the interior surface 11 of the filter screen 10, which does not alter the fact that when the invention is applied in the context of a filter assembly as shown, it is also possible for the anti-biofouling system 30 to be designed to subject one or more other areas of the filter assembly to an anti-biofouling action. In this respect, it is noted that in all of the embodiments shown in FIGS. 2-9, all of the one or more light sources 32 of the anti-biofouling system 30 are associated with the shaft-arms combination 24 of the filter cleaning system 20, but that this is not necessary in the framework of the invention, and that possibilities of alternative positioning of the one or more light sources 32 are not excluded.

Figure 2:
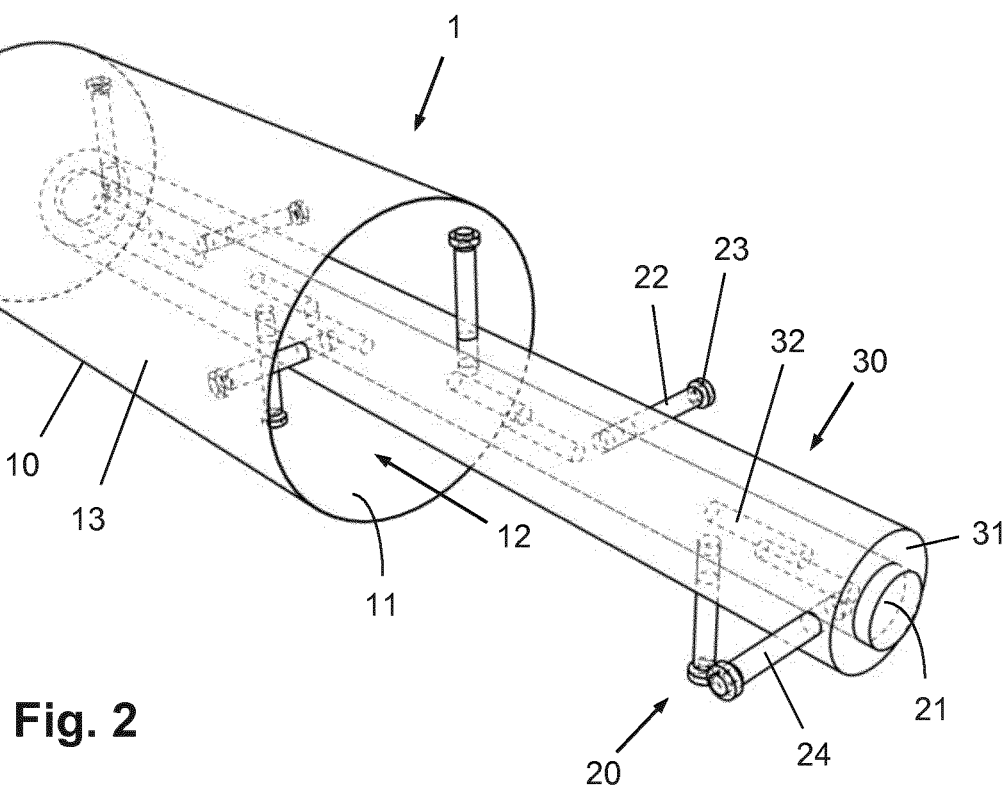
FIG. 2 diagrammatically shows a perspective view of a filter assembly according to a first embodiment of the invention, comprising a tubular filter screen, a filter cleaning system and an anti-biofouling system, with a portion of the filter screen removed.
Figure 3:
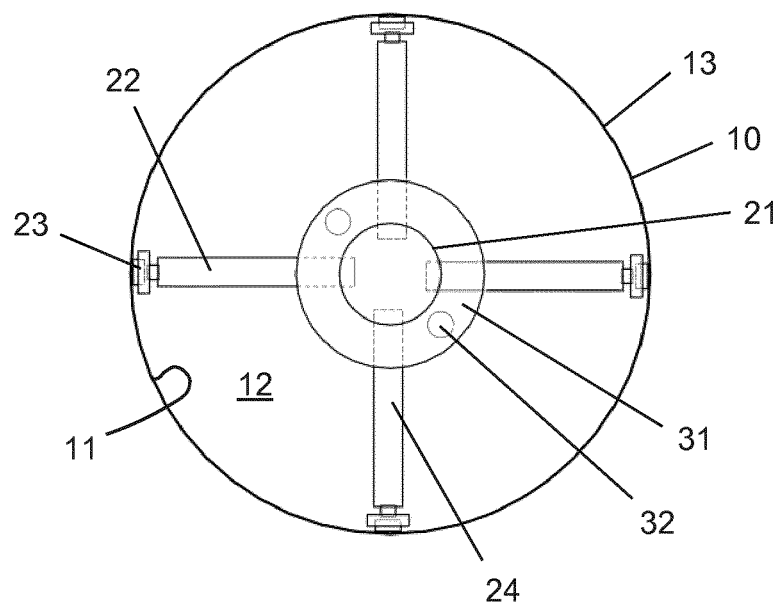
FIG. 3 diagrammatically shows a cross-sectional view of the filter assembly shown in FIG. 2.

FIGS. 2 and 3 relate to a filter assembly 1 according to a first embodiment of the invention, which does not only comprise a filter cleaning system 20, but also an anti-biofouling system 30, as mentioned in the foregoing, which anti-biofouling system 30 has a function in subjecting the interior surface 11 of the filter screen 10 to an anti-biofouling action. To this end, the anti-biofouling system 30 comprises a covering 31 of the shaft 21, which may be provided in the form of a silicone sleeve surrounding the shaft 21 and extending along the length of the shaft 21. The covering 31 contains lamps 32 and wiring for powering the lamps 32 during operation of the anti-biofouling system 30. During the manufacturing process of the filter assembly 1, it is most practical for the covering 31 to be applied to the shaft 21 before the radial arms 22 are put in place on the shaft 21. Silicone is an example of material that is transparent to anti-biofouling light in the form of ultraviolet light. Additionally or alternatively, the covering 31 may comprise at least one other material.

An anti-biofouling action on the interior surface 11 of the filter screen 10 is realized when the lamps 32 of the anti-biofouling system 30 are switched on. The lamps 32 may be of any suitable type, and may be of any appropriate shape and size. By rotating the shaft-arms combination 24 and displacing the shaft-arms combination 24 in the axial direction, it is possible to achieve total coverage of the interior surface 11 of the filter screen 10 with the anti-biofouling light emitted by the lamps 32 during operation thereof. In order to avoid biofouling of the entire filter screen 10, it is important that the shaft-arms combination 24 is at least moved at certain intervals. It may be so that the lamps 32 are only switched on during movement of the shaft-arms combination 24, but other options for operating the lamps 32 are also available in the framework of the invention. In case operation of the lamps 32 is coupled to movement of the shaft-arms combination, the total need for movement of the shaft-arms combination 24, which determines the duration of allowable intervals of a stationary condition of the shaft, can be found by taking into account aspects like the quality of the water, the diameter of the filter screen 10 and power of the lamps 32. As mentioned earlier, any suitable controller may be used for controlling the movements of the shaft-arms combination 24, and such controller may also be used for guaranteeing that the movements of the shaft-arms combination 24 are invoked often enough for avoiding biofouling of the filter screen 10. This is equally applicable to the other embodiments of the filter assembly 2, 3, 4 according to the invention to be discussed in the following.

During operation of the anti-biofouling system 30, the lamps 32 are powered through the wiring. The electrical power which is needed in the process may be supplied to the wiring in any suitable way. The wiring may be connected to an energy source which is arranged outside of the shaft-arms combination 24, but it is also possible to apply a system of coils and magnets for generating electrical power as the shaft-arms combination 24 moves, in which case the coils may be arranged on the debris receiving end 23 of each of the radial arms 22, and the magnets may be arranged at appropriate positions at an exterior surface 13 of the filter screen 10, to mention only two examples of many practical possibilities.

Figure 4:
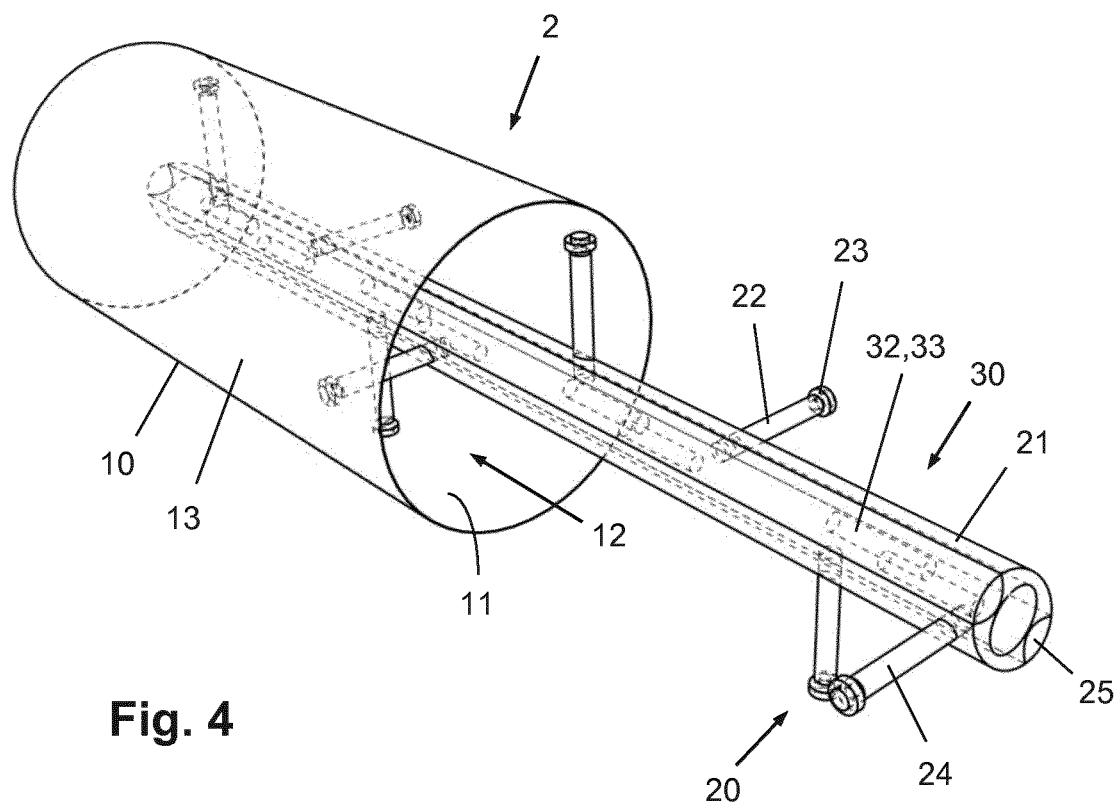
FIG. 4 diagrammatically shows a perspective view of a filter assembly according to a second embodiment of the invention, comprising a tubular filter screen, a filter cleaning system and an anti-biofouling system, with a portion of the filter screen removed.
Figure 5:
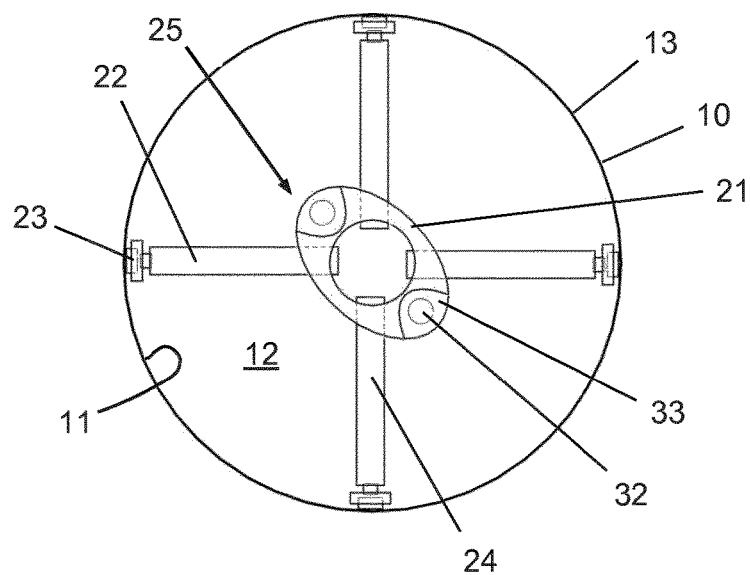
FIG. 5 diagrammatically shows a cross-sectional view of the filter assembly shown in FIG. 4.

FIGS. 4 and 5 relate to a filter assembly 2 according to a second embodiment of the invention. In this embodiment, the anti-biofouling system 30 comprises a number of lamps 32, each lamp 32 being situated in a carrier strip 33. In fact, the second embodiment is comparable to the first embodiment in the sense that the collection of carrier strips 33 accommodating a lamp 32 is comparable to portions of the covering 31 accommodating lamps 32. An advantage of applying a number of carrier strips 33 on the shaft 21 instead of a single covering 31 is that it is possible to replace one or more lamps 32 without needing to take the shaft-arms combination 24 apart, wherein replacement of lamps 32 is furthermore much easier as it only involves handling of relatively small objects, namely the carrier strips 33 accommodating a lamp 32. Like the covering 30 of the first embodiment, the carrier strips 33 may be made of silicone. In general, it is practical for the carrier strips 33 to comprise at least one material that is transparent to the anti-biofouling light of the lamps 32.

Figure 6:
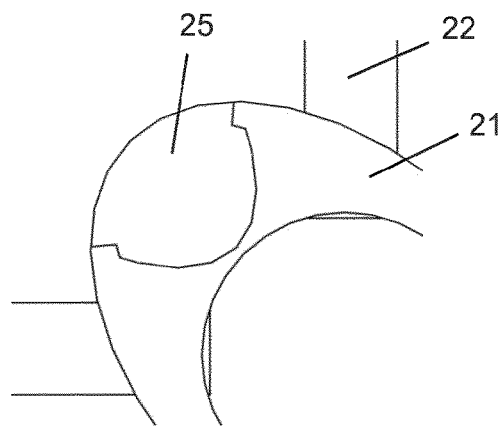
FIG. 6 illustrates an alternative of a detail of the filter assembly shown in FIG. 4.

The shaft 21 may be provided with an elliptical outer periphery, so as to have enough space in the shaft 21 for embedding the carrier strips 33 accommodating a lamp 32, as can best be seen in FIG. 5. In the shown example, the shaft 21 is provided with two recesses 25 extending along the length of the shaft 21, which are suitable for accommodating a number of the carrier strips 33, wherein it is advantageous for the shape of the carrier strips 33 to be adapted to the shape of the recesses 25, such that each of the carrier strips 33 fits exactly in a recess portion. The recesses 25 may be shaped so as to be non-releasing in a radial direction, as illustrated in FIG. 6. In such a case, putting carrier strips 33 accommodating a lamp 32 in place in the shaft 21 may involve introducing the carrier strips 33 to one of the recesses 25 at one end of the shaft 21 and sliding the carrier strips 33 to an axial position on the shaft 21 as desired. Any suitable means for fixing the carrier strips 33 in the recesses 25 may be used, if the carrier strips 33 are not kept in place in the recesses 25 on the basis of form closure.

During operation of the anti-biofouling system 30, the lamps 32 are powered, whereby an anti-biofouling action is performed on the interior surface 11 of the filter screen 10. The electrical power which is needed in the process may be supplied to the lamps 32 in any suitable way. The lamps 32 may be of any suitable type, and may be of any appropriate shape and size. By rotating the shaft-arms combination 24 and displacing the shaft-arms combination 24 in the axial direction, it is possible to achieve total coverage of the interior surface 11 of the filter screen 10 with the anti-biofouling light emitted by the lamps 32 during operation thereof. The carrier strips 33 may be provided with a reflective back side for increasing the light output and/or optimizing the light distribution. In this respect, for the sake of clarity, it is noted that the side of the carrier strips 33 for facing and contacting the shaft 21 is regarded as being the back side of the carrier strips 33.

Figure 7:
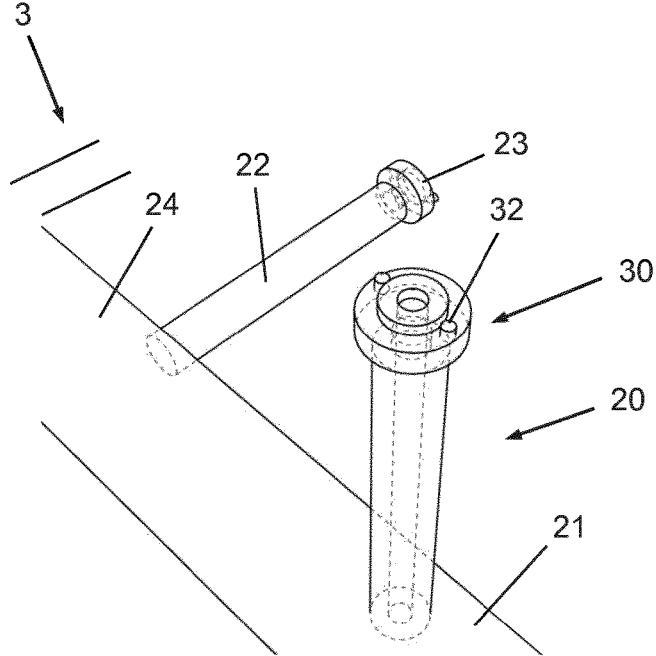
FIG. 7 diagrammatically shows a perspective view of a portion of a filter assembly according to a third embodiment of the invention, comprising a tubular filter screen, a filter cleaning system and an anti-biofouling system.

FIG. 7 relates to a filter assembly 3 according to a third embodiment of the invention. In this embodiment, the anti-biofouling system 30 comprises a number of lamps 32, wherein the debris receiving end 23 of each of the radial arms 22 is provided with at least one of those lamps 32. In the shown example, the number of lamps 32 situated at the debris receiving end 23 of each of the radial arms 22 is two. During operation of the anti-biofouling system 30, the lamps 32 are powered, whereby an anti-biofouling action is performed on the interior surface 11 of the filter screen 10. The electrical power which is needed in the process may be supplied to the lamps 32 in any suitable way, such as through wiring extending through the shaft 21 and the radial arms 22. By rotating the shaft-arms combination 24 and displacing the shaft-arms combination 24 in the axial direction, it is possible to achieve total coverage of the interior surface 11 of the filter screen 10 with the anti-biofouling light emitted by the lamps 32 during operation thereof. As the lamps 32 are situated at the debris receiving end 23 of each of the radial arms 22, total coverage can be achieved by letting the axis 21 make the same movements as needed for performing the debris removing action on all portions of the interior surface 11 of the filter screen 10. Thus, in this embodiment, it is particularly advantageous to combine an anti-biofouling action with a debris removing action.

The lamps 32 may be of any suitable type, and may be of any appropriate shape and size. In view of the fact that the lamps 32 are at a position which is very close to the interior surface 11 of the filter screen 10, the anti-biofouling light emitted by the lamps 32 during operation thereof only needs to travel a minimum distance through the water. As a consequence, it is possible for the lamps 32 to be low power lamps, particularly LEDs. An advantage of using LEDs resides in a long lifetime of the LEDs, on the basis of which it may be possible to dispense with the need of replacement of the lamps 32 during the lifetime of the filter assembly 3.

Figure 8:
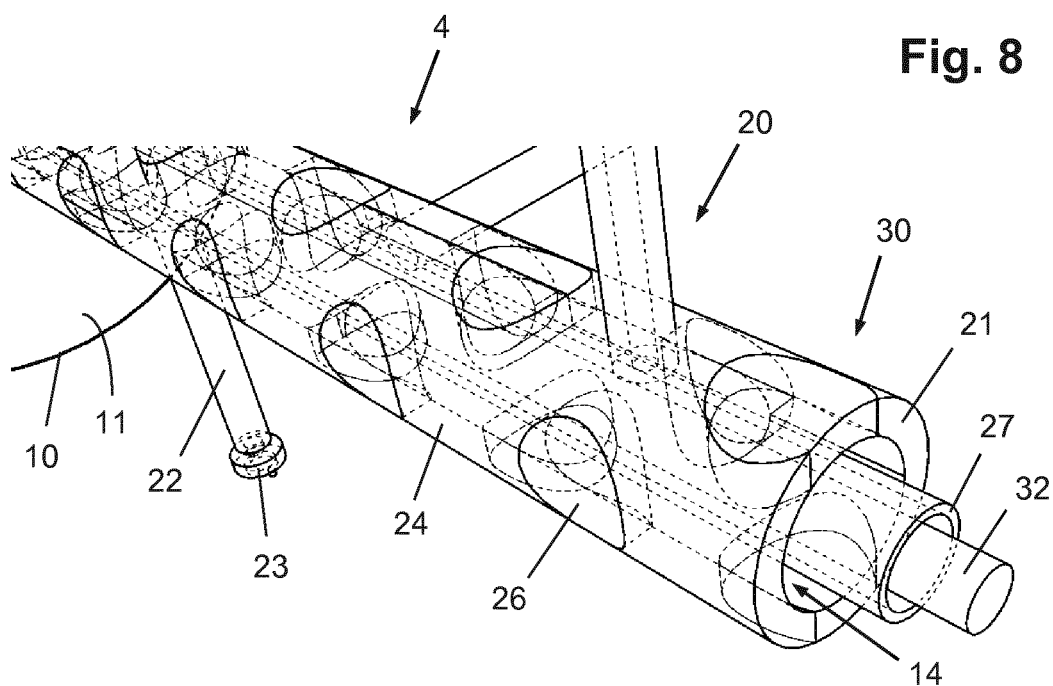
FIG. 8 diagrammatically shows a perspective view of a portion of a filter assembly according to a fourth embodiment of the invention, comprising a tubular filter screen, a filter cleaning system and an anti-biofouling system.
Figure 9:
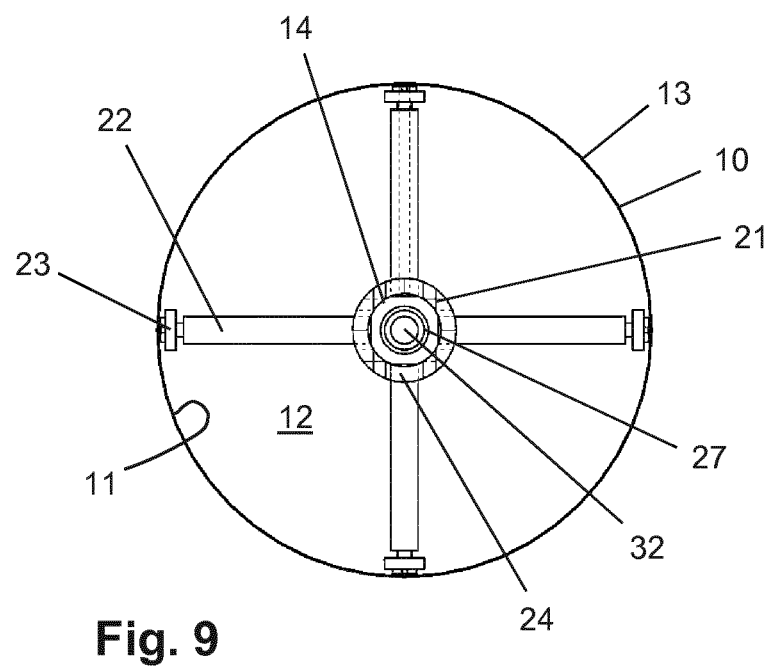
FIG. 9 diagrammatically shows a cross-sectional view of the filter assembly shown in FIG. 8.

FIGS. 8 and 9 relate to a filter assembly 4 according to a fourth embodiment of the invention. In this embodiment, the anti-biofouling system 30 comprises a single lamp 32. In particular, the lamp 32 has a tubular shape and extends through the shaft 21, and the shaft 21 is provided with windows 26 for allowing the anti-biofouling light emitted by the lamp 32 during operation thereof to shine from the shaft 21 at predetermined positions. The windows 26 may be made of fused silica, for example. Furthermore, the filter assembly 4 may comprise a protective sleeve 27 extending through the shaft 21, for encompassing the lamp 32 of the anti-biofouling system 30, which sleeve 27 may also be made of fused silica. In order not to hinder a discharge of debris containing water through the shaft 21, it is practical if the dimensions of the lamp 32 and the protective sleeve 27 are chosen such that not all of an interior space 14 of the shaft 21 is taken by the lamp 32 and the protective sleeve 27.

During operation of the anti-biofouling system 30, the lamp 32 is powered, whereby an anti-biofouling action is performed on the interior surface 11 of the filter screen 10, wherein, as the shaft-arms combination 24 rotates and/or is replaced in the axial direction, a process takes place in which the position of the windows 26 relative to the interior surface 11 of the filter screen 10 continuously changes, so that the surface portions which are subjected to an anti-biofouling action continuously change. The size and shape of the windows 26 are chosen such that in combination with the movability of the shaft-arms combination 24, it is possible to realize total coverage of the interior surface 11 of the filter screen 10.

An advantage of the fourth embodiment is that the lamp 32 does not need to move along with the shaft-arms combination 24, whereby supply of electrical power to the lamp 32 is facilitated. Furthermore, the lamp 32 can be easily replaced, simply by pulling the lamp 32 from the shaft 21 in a first axial direction and inserting a new lamp 32 in the shaft 21 in the opposite axial direction.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species". Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

In respect of the possible application of the invention in the context of a filter assembly, it is noted that such application is not limited to a filter assembly comprising a filter screen 10 having a tubular shape. Instead, the filter assembly may comprise any type of filter screen, wherein the filter screen may have any shape, and wherein the filter screen may have a movable arrangement or a stationary arrangement, whatever is appropriate in a given case.

In the framework of the invention, the at least one source for emitting anti-biofouling light does not necessarily need to comprise at least one lamp which is at a position for directly shining anti-biofouling light on the area to be subjected to an anti-biofouling action, or which is put to such a position as a result of movement of the lamp and/or movement of the area, but may comprise at least one light guide in communication with a lamp, for example, or one or more reflectors for directing light shining from a lamp. Thus, in fact, in the framework of the invention, a light source is supposed to be present at a position or at a range of positions where light is emitted, particularly light which is used for covering the area as mentioned, irrespective of whether the light is supplied in a direct manner by shining from a lamp or in an indirect manner through a light guide, a reflector, etc.

In the assembly 1, 2, 3, 4, according to the invention, it is possible for the one or more light sources 32 of the anti-biofouling system 30 to be switched on as long as the at least two elements 10, 24 which are present in the assembly 1, 2, 3, 4 in a movable arrangement relative to each other are actually moved. In such a case, activation of the one or more light sources 32 may be coupled to the relative movement of the elements 10, 24. However, in the framework of the invention, it is also possible that the one or more light sources 32 are put in an activated condition only during one or more intervals of a period of relative movement of the elements 10, 24. Also, it is possible that the one or more light sources 32 are put in an activated condition only in different stationary conditions of the assembly 1, 2, 3, 4.

Figure 10:
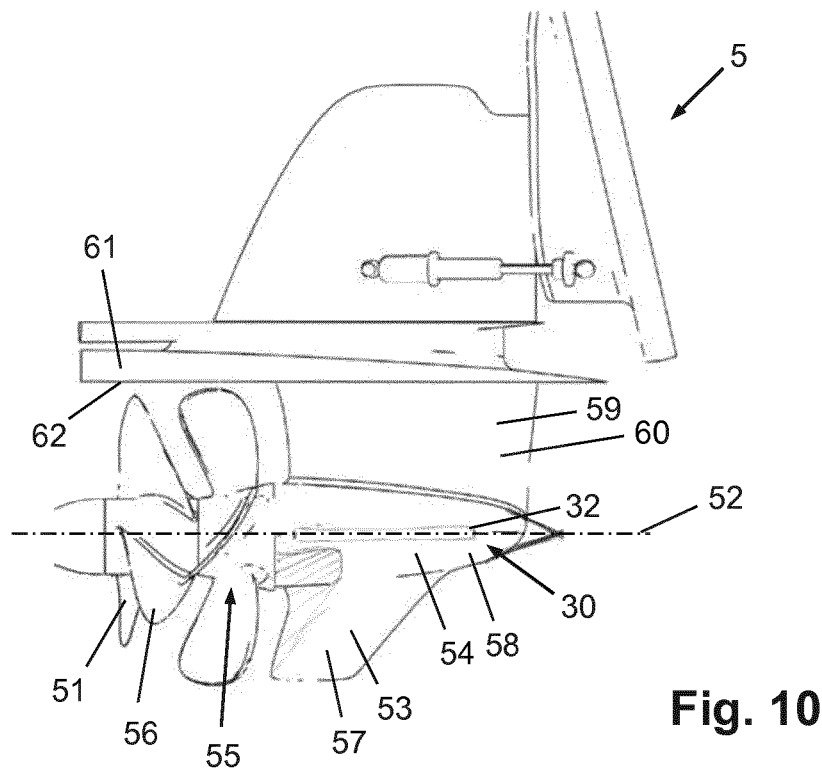
FIGS. 10-12 relate to a boat drive and steer assembly including a propeller and a fin, and being equipped with an anti-biofouling system, wherein FIG. 10 diagrammatically shows a side view of the assembly, wherein FIG. 11 diagrammatically shows a back view of the assembly, and wherein FIG. 12 diagrammatically shows a perspective view of the assembly, with a different positioning of light sources of the anti-biofouling system than shown in FIGS. 10 and 11.
Figure 11:
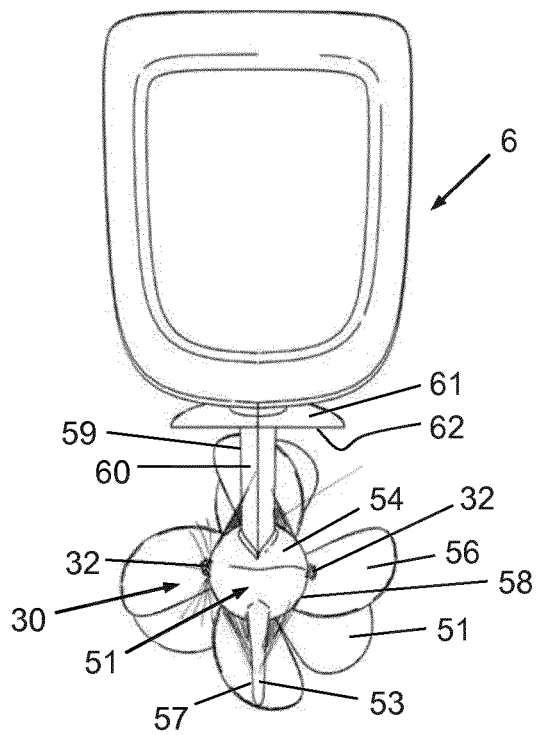
Figure 12:
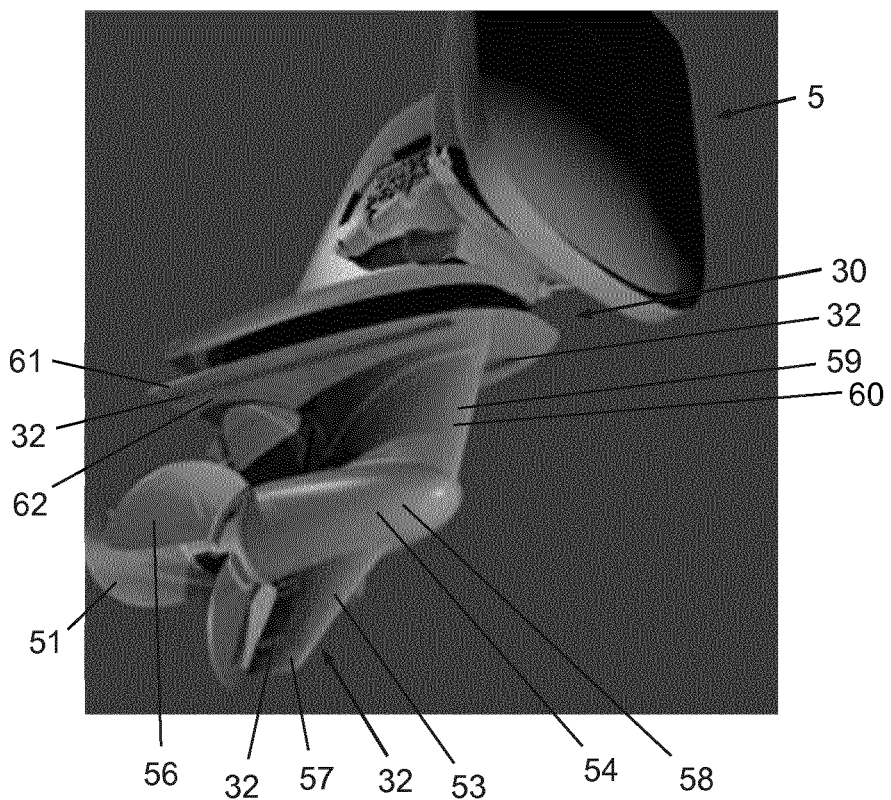

Another practical application of the invention than an application in the field of filter assemblies 1, 2, 3, 4 as explained in the foregoing is an application in the field of boat drive and steer assemblies. FIGS. 10-12 relate to one feasible example of a boat drive and steer assembly 5, which is also known as stern drive, and which is intended for arrangement at the back of a boat. A main component of the assembly 5 is a rotatable propeller 51 which is configured to realize propulsion of a boat when the assembly 5 is properly fixed to the boat and the boat is in the water. A rotation axis of the propeller 51 is diagrammatically depicted in FIG. 10 by means of a dash-and-dot line and indicated by means of reference numeral 52. Another main component of the assembly 5 is a fin 53 which is arranged at a position in front of the propeller 51. The fin 53 extends downwardly from a propeller shaft casing 54 which serves for accommodating a shaft 55 of the propeller 51 and associated gearing. Boat drive and steer assemblies such as stern drives are well known, and therefore, only the details of the assembly 5 shown in FIGS. 10-12 which are relevant in the context of the invention will be explained.

FIGS. 10 and 11 illustrate a first practical way in which the invention may be applied for the purpose of realizing anti-biofouling of portions of the boat drive and steer assembly 5, including surfaces 56, 57, 58 of the propeller 51, the fin 53 and the propeller shaft casing 54, respectively. In the shown example, an anti-biofouling system 30 comprising two elongated light sources 32 which are arranged at opposite sides of the propeller shaft casing 54, and which extend in the direction of the rotation axis 52 of the propeller 51, is provided. The light sources 32 may be provided in the form of an array of lamps such as LEDs, for example. During operation, the anti-biofouling light emitted by the light sources 32 is used for keeping the surfaces 56, 57, 58 of the propeller 51, the fin 53 and the propeller shaft casing 54, respectively, and also other surfaces of the assembly 5, particularly surfaces which are present above the propeller shaft casing 54, such as a surface 59 of a housing part 60 to which the propeller shaft casing 54 is connected, clean from biofouling.

The anti-biofouling effect on the surface 56 of the propeller 51 is optimal when the propeller 51 is rotated, as in that case, all portions of the propeller 51 are placed under the influence of the anti-biofouling system 30 in a continually alternating manner and are thereby treated in a more or less equal manner. Thus, the driving function of the boat drive and steer assembly 5, which is obtained by rotating the propeller 51 relative to the propeller shaft casing 54, or speaking more generally, the stationary part of the assembly 5, can be recognized as being the first function of the assembly 5. The fact is that when the propeller 51 is rotated for performing the driving function, coverage of the surface 56 of the propeller 51 with the anti-biofouling light is realized in the process. In order to enhance the anti-biofouling effects from the anti-biofouling system 30, it is a practical option to apply material that is highly reflective to the anti-biofouling light at the surface 56 of the propeller 51 and/or at one or more other appropriate surfaces 57, 58, 59 of the boat drive and steer assembly 5.

In the boat drive and steer assembly 5, the anti-biofouling system 30 may comprise any suitable number of light sources 32, and various possibilities are available when it comes to positioning the at least one light source 32 of the system 30 in the assembly 5. For example, one or more light sources 32 may be positioned on the fin 53 and/or the housing part 60 as present directly above the propeller shaft casing 54 and/or one or more other parts of the assembly 5, such as a bottom surface 62 of a plate-like element 61 to which the housing part 60 is connected at a top side thereof. In this respect, it is noted that FIG. 12 illustrates a second practical way in which the invention may be applied for the purpose of realizing anti-biofouling of portions of the assembly 5, including the surface 56 of the propeller 51. In the configuration shown in FIG. 12, two elongated light sources 32 are arranged on the bottom surface 62 of the plate-like element 61 mentioned earlier, extending along a substantial part of the length thereof, at a port position and a starboard position in the assembly 5, respectively, and two elongated light sources 32 are arranged on the fin 53, at opposite sides thereof. Furthermore, it is noted that it is also possible to provide a hollow propeller shaft 55, to apply material that is transparent to the anti-biofouling light in the propeller shaft 55, to use an elongated light source 32, and to arrange such light source 32 so as to extend through the hollow propeller shaft 55, for the purpose of keeping the surface 56 of the propeller 51 clean from biofouling. On the other hand, it is a possibility to add elements to the design of the assembly 5 for the purpose of holding one or more light sources 32 at positions which are advantageous as far as improving anti-biofouling coverage of the surface 56 of the propeller 51 and possibly also one or more other surfaces 57, 58, 59, 62 of the assembly 5 is concerned.

The light sources 32 of the anti-biofouling system 30 used with the boat drive and steer assembly 5 may be controlled in any suitable manner. For example, it is possible to realize a relation between the intensity of the anti-biofouling light and a rotation speed of the propeller 51, wherein a higher light intensity is associated with a lower rotation speed. Also, it may be useful to have a higher light intensity after a period in which the system 30 has been off. In the context of a boat drive and steer assembly 5 which is equipped with an anti-biofouling system 30, it may furthermore be useful to have measures which are aimed at ensuring that when the propeller 51 is kept in a stationary condition for a certain period, the propeller 51 is made to rotate only for the purpose of achieving anti-biofouling effects on the surface 56 of the propeller 51, and not for the purpose of propulsion of the boat, so that the entire surface 56 of the propeller 51 may be kept clean from biofouling instead of only those portions of the surface 56 which happen to have a position for receiving most of the anti-biofouling light in the stationary condition. For example, in such a case, the propeller 51 may be rotated a predetermined number of times per day, while the anti-biofouling system 30 is on. In doing so, it may be advantageous to take care that at the end of the rotation cyclus, the propeller 51 is in another position about the rotation axis 52 than at the start of the rotation cyclus. In general, the boat drive and steer assembly 5 may be equipped with a suitable type of controller, which is programmed to realize control of the anti-biofouling system 30 as desired, by switching the system 30 on and off and setting the intensity of the anti-biofouling light, for example, and possibly also to take care that the propeller 51 is rotated from time to time when the propeller 51 appears to be in a stationary condition.

The invention claimed is:

1. An assembly, comprising:
   at least two elements in a movable arrangement relative to each other that perform a first function of the assembly, and
   an anti-biofouling system that subjects at least a surface area of the assembly that is to be at least partially exposed to water to an anti-biofouling action as an additional function of the assembly,
   wherein the additional function is different from the first function of the assembly,
   wherein the anti-biofouling system comprises one or more light sources that emit anti-biofouling light directed toward the at least a surface area to be subject to the anti-biofouling action,
   wherein the anti-biofouling system is adapted to realize coverage of the at least a surface area with the anti-biofouling light on a basis of movement of the anti-biofouling light from the one or more light sources relative to the at least a surface area,
   wherein the movement of the anti-biofouling light from the one or more light sources is caused by movement of the at least two elements relative to each other while performing the first function of the assembly,
   wherein one of the at least two elements is an encompassing element having an interior space, wherein the other of the at least two elements is an encompassed element extending
   at least partially through the interior space of the encompassing element, and
   wherein the at least a surface area to be subjected to the anti-biofouling action includes at least a surface portion of the interior space of the encompassing element.

2. The assembly according to claim 1, wherein the one or more light sources of the anti-biofouling system are situated at one of the at least two elements for emitting the anti-biofouling light to the other of the at least two elements.

3. The assembly according to claim 1, wherein the one or more light sources of the anti-biofouling system are arranged for emitting the anti-biofouling light to surface portions of at least one of the at least two elements that are successively put in an ambit of the one or more light sources during the relative movement of the at least two elements.

4. The assembly according to claim 1, comprising a controller that is adapted to assess whether the at least two elements are in a stationary position with respect to each other, and if the at least two elements are in the stationary position
relative to each other, to assess whether a duration of the relative stationary position exceeds a predetermined maximum duration, and,
if the duration exceeds the predetermined maximum duration, to initiate relative movement of the at least two elements in combination n with an activated condition of the one or more light sources of the anti-biofouling system.

5. The assembly according to claim 1,
wherein the encompassed element is both rotatable and linearly displaceable relative to the encompassing element, and
wherein the one or more light sources of the anti-biofouling system are situated at the encompassed element.

6. The assembly according to claim 5, wherein the one or more light sources of the anti-biofouling system are arranged for emitting the anti-biofouling light to surface portions of the encompassing element that are successively put in an ambit of the one or more light sources during movement of the encompassed element relative to the encompassing element.

7. The assembly according to claim 1,
wherein the anti-biofouling system comprises a covering of at least a surface portion of at least one of the at least two elements, wherein the one or more light sources of the anti-biofouling system
are situated in the covering, and
wherein the covering is at least partially transparent to the anti-biofouling light of the one or more light sources.

8. The assembly according to claim 1,
wherein the anti-biofouling system comprises at least one carrier member,
wherein the one or more light sources of the anti-biofouling system are situated in the at least one carrier member, and wherein the at least one carrier member is at least partially transparent to the anti-biofouling light of the one or more light sources, and wherein at least one of the at least two elements comprises
at least one recess, and
wherein the at least one carrier member of the anti-biofouling system is situated in the at least one recess.

9. The assembly according to claim 1,
wherein the encompassed element comprises a shaft that is at least partially hollow,
wherein the one or more light sources of the anti-biofouling system are situated inside the shaft, and
wherein the shaft is at least partially transparent to the anti-biofouling light of the one or more light sources.

10. The assembly according to claim 1, comprising
a power system that supplies electrical power to be used for driving the one or more light sources of the anti-biofouling system,
wherein the power system is adapted to generate the electrical power on the basis of the movement of at least one of the at least two elements.

11. The assembly according to claim 1, comprising
a tubular filter screen and
a movable shaft that is at least partially encompassed by the tubular filter screen and carrying members of a filter cleaning system for removing and receiving debris from an interior space of the tubular filter screen, wherein the carrying members of the filter cleaning system have an elongated shape and project from the movable shaft towards the interior space of the tubular filter screen, and wherein the one or more light sources of the anti-biofouling system are situated at an end of the carrying members facing the interior surface of the tubular filter screen.

12. The assembly according to claim 1,
wherein the assembly is a water bearing,
wherein the encompassed element comprises a movable shaft, and
wherein the encompassing element comprises a bearing shell,
wherein the bearing shell comprises grooves in an interior surface thereof.

13. A vessel, comprising at least one assembly according to claim 1.

14. The vessel according to claim 13, comprising:
a ballast water system having one or more ballast tanks, and
a water filtering system for treating water coming into the vessel that serves as ballast water,
wherein the at least one assembly is part of the water filtering system of the ballast water system.

* * * * *